United States Patent
Eckstein et al.

(10) Patent No.: US 7,976,614 B2
(45) Date of Patent: Jul. 12, 2011

(54) METHOD FOR CLEANING THE FILTERS OF A VACUUM CLEANER AND VACUUM CLEANER FOR CARRYING OUT THE METHOD

(75) Inventors: Daniel Eckstein, Winnenden-Baach (DE); Thorsten Langen, Stuttgart (DE)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 224 days.

(21) Appl. No.: 12/321,966

(22) Filed: Jan. 26, 2009

(65) Prior Publication Data

US 2009/0205499 A1  Aug. 20, 2009

Related U.S. Application Data

(63) Continuation of application No. PCT/EP2006/007545, filed on Jul. 29, 2006.

(51) Int. Cl.
*B01D 46/04* (2006.01)

(52) U.S. Cl. ............... 95/279; 55/302; 55/429; 55/420; 55/288; 55/467; 55/DIG. 3; 15/352

(58) Field of Classification Search .............. 55/294, 55/302, 304, 341.1, 342, 431, 467, DIG. 3; 95/279, 282, 286; 15/339, 347; 123/519, 123/520
See application file for complete search history.

(56) References Cited

U.S. PATENT DOCUMENTS

| | | | |
|---|---|---|---|
| 2,591,567 A | 4/1952 | Lofgren et al. | |
| 3,509,394 A | 4/1970 | Heidtmann | |
| 3,748,836 A * | 7/1973 | Bachle | 55/302 |
| 3,994,067 A | 11/1976 | Hazzard et al. | |
| 4,033,732 A | 7/1977 | Axelsson et al. | |
| 4,124,915 A | 11/1978 | Schlicher | |
| 4,124,916 A * | 11/1978 | Fromknecht | 15/339 |
| 4,171,208 A | 10/1979 | Lowder | |
| 4,277,265 A | 7/1981 | Leinfelt | |
| 4,329,161 A | 5/1982 | Osborn | |
| RE31,417 E | 10/1983 | Huber | |
| 4,482,129 A | 11/1984 | Baker et al. | |
| 4,581,135 A | 4/1986 | Gerulis | |

(Continued)

FOREIGN PATENT DOCUMENTS

DE  210 658  6/1909

(Continued)

*Primary Examiner* — Duane Smith
*Assistant Examiner* — Minh-Chau Pham
(74) *Attorney, Agent, or Firm* — Lipsitz & McAllister, LLC

(57) ABSTRACT

The invention relates to a method for cleaning the filters of a vacuum cleaner. A dirt collecting container of the vacuum cleaner has a suction inlet and is in flow connection with at least one suction unit via at least one filter and at least one suction extraction line. At least one external air inlet is provided which opens into the suction extraction line downstream of the filter and can be closed by a closing valve. The closing valve has a movable valve body which is acted upon by a closing spring with a closing force. In order to clean the filter, the closing valve is opened and the side of the filter that is oriented away from the dirt collecting container is impinged upon by external air. The valve body is acted upon, irrespective of its position, by the closing force of the closing spring and, in a position at a distance from the valve seat, additionally acted upon by a repulsion force of a resilient stop element.

28 Claims, 2 Drawing Sheets

U.S. PATENT DOCUMENTS

| | | | |
|---|---|---|---|
| 4,719,662 A | 1/1988 | Horak et al. | |
| 4,733,326 A | 3/1988 | Harsch et al. | |
| 4,921,510 A | 5/1990 | Plooy | |
| 5,002,594 A * | 3/1991 | Merritt | 55/302 |
| 5,178,652 A * | 1/1993 | Huttlin | 95/279 |
| 5,246,205 A | 9/1993 | Gillingham et al. | |
| 5,368,060 A | 11/1994 | Worrall et al. | |
| 5,882,180 A * | 3/1999 | Kawaguchi et al. | 417/222.2 |
| 5,975,062 A * | 11/1999 | Bonse et al. | 123/519 |
| 6,406,505 B1 | 6/2002 | Oh et al. | |
| 6,440,191 B1 | 8/2002 | Berfield et al. | |
| 6,458,178 B1 | 10/2002 | Dietz et al. | |
| 6,517,325 B2 * | 2/2003 | Tsuru et al. | 417/298 |
| 6,640,385 B2 | 11/2003 | Oh et al. | |
| 6,782,583 B2 | 8/2004 | Oh | |
| 6,936,161 B2 | 8/2005 | Wright et al. | |
| 7,340,797 B2 | 3/2008 | Theiss, Jr. et al. | |
| 7,647,672 B2 | 1/2010 | Nam et al. | |
| 2002/0066262 A1 | 6/2002 | Oh | |
| 2002/0088078 A1 | 7/2002 | Oh et al. | |
| 2002/0124729 A1* | 9/2002 | Dudley | 95/282 |
| 2003/0167590 A1 | 9/2003 | Oh | |
| 2005/0011036 A1 | 1/2005 | McCutchen | |
| 2005/0251953 A1 | 11/2005 | Hackwell et al. | |
| 2005/0254270 A1 | 11/2005 | Melchert et al. | |
| 2008/0086835 A1 | 4/2008 | Stewen et al. | |
| 2008/0092498 A1 | 4/2008 | Stewen et al. | |
| 2009/0027823 A1 | 1/2009 | Follic et al. | |
| 2009/0205158 A1 | 8/2009 | Eckstein et al. | |
| 2009/0205159 A1 | 8/2009 | Stewen et al. | |

FOREIGN PATENT DOCUMENTS

| | | |
|---|---|---|
| DE | 1 800 480 | 6/1970 |
| DE | 2 106 058 | 9/1971 |
| DE | 91 04 127 | 7/1991 |
| DE | 41 38 223 | 2/1993 |
| DE | 298 23 411 | 5/1999 |
| DE | 199 49 095 | 4/2001 |
| DE | 200 10 608 | 12/2001 |
| DE | 100 56 935 | 2/2002 |
| DE | 101 40 351 | 6/2002 |
| DE | 101 01 219 | 7/2002 |
| DE | 101 50 257 | 7/2002 |
| DE | 102 40 618 | 9/2003 |
| DE | 10 2005 029 606 | 1/2006 |
| DE | 10 2004 056 076 | 5/2006 |
| DE | 10 2005 017 568 | 10/2006 |
| DE | 10 2005 017 702 | 12/2006 |
| DE | 10 2005 035 884 | 2/2007 |
| EP | 0 289 987 | 11/1988 |
| EP | 0 955 003 | 11/1999 |
| EP | 1 166 705 | 1/2002 |
| EP | 1 656 872 | 5/2006 |
| GB | 956764 | 4/1964 |
| GB | 2 337 922 | 12/1999 |
| JP | 08038401 | 2/1996 |
| JP | 2002028107 | 1/2002 |
| JP | 2006181228 | 7/2006 |
| WO | 95/10972 | 4/1995 |
| WO | 95/27431 | 10/1995 |
| WO | 97/19630 | 6/1997 |
| WO | 01/74493 | 10/2001 |
| WO | 2004/100752 | 11/2004 |
| WO | 2008/014794 | 2/2008 |
| WO | 2008/014795 | 2/2008 |
| WO | 2008/014796 | 2/2008 |
| WO | 2008/014797 | 2/2008 |

* cited by examiner

METHOD FOR CLEANING THE FILTERS OF A VACUUM CLEANER AND VACUUM CLEANER FOR CARRYING OUT THE METHOD

This application is a continuation of international application number PCT/EP2006/007545 filed on Jul. 29, 2006.

The present disclosure relates to the subject matter disclosed in international application number PCT/EP2006/007545 of Jul. 29, 2006, which is incorporated herein by reference in its entirety and for all purposes.

BACKGROUND OF THE INVENTION

The invention relates to a method for cleaning the filters of a vacuum cleaner comprising a dirt collecting container, which has a suction inlet and is in flow connection with at least one suction unit via at least one filter and at least one suction extraction line, and comprising at least one external air inlet which opens into the suction extraction line downstream of the at least one filter and can be closed by means of at least one closing valve, wherein the at least one closing valve has a valve body which is movable back and forth between a closed position and an open position, and is acted upon by a closing spring with a closing force, which valve body lies against a valve seat in the closed position and is at a distance from the valve seat in the open position, wherein, in order to clean the at least one filter, at least one closing valve is opened and the side of the at least one filter that is oriented away from the dirt collecting container is impinged upon by external air.

The invention also relates to a vacuum cleaner for carrying out the method.

By means of the vacuum cleaners in question here, dirt and preferably also liquid can be sucked up using at least one suction unit to apply negative pressure to the dirt collecting container, so that a suction flow forms and dirt and liquid can be sucked into the dirt collecting container. The vacuum cleaners have one or more filters, which are disposed in the flow path between the dirt collecting container and the at least one suction unit and serve for separating solid substances from the suction flow. During suction operation, dirt particles are increasingly deposited on the side of the at least one filter that is oriented toward the dirt collecting container, so that after some time the filter or filters have to be cleaned. For cleaning, the side of the filters that is oriented away from the dirt collecting container can be impinged upon by external air, by opening at least one closing valve, so that external air can flow into the at least one suction extraction line via the external air inlet and impinge upon the side of the at least one filter that is orientated away from the dirt collecting container.

In utility model DE 298 23 411 U1, to clean a filter it is proposed to close for a short time a suction hose that is connected to the suction inlet of the dirt collecting container, so that a strong negative pressure forms in the dirt collecting container, and a closing valve is subsequently to be opened for a short time. The filter is then flowed through by the external air in the direction of counterflow, that is to say counter to the direction of the suction flow that prevails during normal suction operation, so that dirt particles adhering to the filter become detached. As a result, effective cleaning of the filter can be achieved, but for this purpose suction operation must be interrupted by the user.

In DE 199 49 095 A1, it is proposed to use two filters, which are cleaned in turn, it being possible during the cleaning of one filter for the suction operation to be continued to a restricted extent by way of the other filter. However, this requires a complex construction, the two filters having to be of a considerable overall size in order to make an adequate suction flow possible during the unrestricted suction operation. Furthermore, the alternative cleaning of one filter at a time, while at the same time maintaining suction operation by way of the other filter, is in many cases susceptible to faults.

WO 97/19630 A discloses a vacuum cleaner with a dirt collecting container at the suction outlet of which a filter is disposed. For cleaning, the filter can be flowed through by external air counter to the direction of flow prevailing during suction operation. For this purpose, the vacuum cleaner has an external air inlet which opens into the suction extraction line and can be closed by means of a closing valve. The closing valve comprises a valve body which is acted upon by a closing spring with a closing force and in each position lies against a resilient stop element. The force of the stop element, like the spring force of the closing spring, permanently acts on the valve body. To attain its opened position, from its closed position the valve body must immediately overcome both forces.

It is an object of the present invention to provide a method of the type mentioned at the beginning in which all the filters present can be flowed through by suction air during suction operation, but for the user there does not have to be any noticeable interruption in suction operation for filter cleaning.

SUMMARY OF THE INVENTION

This object is achieved according to the invention in the case of a method of the generic type by the valve body of the closing valve being acted upon, irrespective of its position, by a closing force of the closing spring and, in a position at a distance from the valve seat, additionally acted upon by the repulsion force of a resilient stop element, the resilient stop element only acting with a force upon the valve body when the latter is disposed at a distance from the valve seat.

In the case of the vacuum cleaner according to the invention, the suction air is filtered by means of the filters present, all the filters being used at the same time during normal suction operation. This may involve a single filter or a number of filters that are flowed through simultaneously. During normal suction operation, the at least one closing valve is closed, its valve body lying against the valve seat in a sealing manner and being acted upon by the closing spring with a closing force. The entering of external air into the suction extraction line is consequently interrupted. To clean the at least one filter, the closing valve is opened, no overly great force having to be exerted on the valve body to make it come away from the valve seat, since, from its closed position, the valve body only has to overcome the closing force of the closing spring. When, however, the valve body assumes a position at a distance from the valve seat, that is to say a position in which external air can flow into the suction extraction line through the closing valve and impinge upon the at least one filter, the valve body experiences in addition to the closing force exerted by the closing spring a repulsion force that is exerted by a resilient stop element. The valve body is accelerated in the direction of its closed position by the repulsion force, since the repulsion force is directed in the same direction as the closing force of the closing spring. Under the action of the two forces, the valve body reliably assumes its closed position again within a very short time. The feeding of external air consequently only takes place for a very short time, for example for a time period of less than 500 milliseconds, in particular for a time period of less than 200 milliseconds. This has the advantage that, although the at least one filter can be impinged upon by external air for a short time on its side oriented away from the dirt collecting container for cleaning, complete pressure equalization does not however occur inside the dirt collecting container, but rather a negative pressure can be maintained within the dirt collecting container during the entire filter cleaning. The resilient stop element, which is used in addition to the closing spring, ensures that the at least one filter can be cleaned effectively within a very short time, without there being any noticeable interruption in suction operation for the user, but rather the suction operation proceeds virtually continuously. The brief opening of the at least one closing valve allows the at least one filter to be impinged upon in an impact-like manner by the entering external air with a pressure surge, which leads to a shaking effect, and consequently mechanical cleaning of the filter; furthermore, the at least one filter is flowed through by external air in the direction of counterflow for a short time. The suction unit is in flow connection with the filter even during the cleaning of the at least one filter, that is to say during the opening of the closing valve. The external air flowing into the suction extraction line for a short time is consequently sucked away again immediately, so that, after the closing valve is closed, the negative pressure prevailing during normal suction operation is established again in the dirt collecting container already within fractions of a second. Accordingly, the at least one filter is flowed through within fractions of a second first by the original suction flow, then for a short time by an external air flow and subsequently again by the suction flow. This results in alternating mechanical loading of the at least one filter, whereby the filter cleaning is assisted. The brief opening of the closing valve takes place under the action of the repulsion force of the resilient stop element, which acts with a force upon the valve body only when the latter is disposed at a distance from the valve seat. If the valve body is lying against the valve seat in a sealing manner, the resilient stop element does not exert any force on the valve body. The stop element forms a kind of shock absorber for the valve body, which absorbs the kinetic energy of the valve body and accelerates the valve body back in the direction of the valve seat. The housing of the vacuum cleaner is thereby protected from impact by the valve body, i.e. the risk of the housing being damaged by the valve body is reduced, and the production of noise by the vacuum cleaner resulting from noises caused by the impact of the valve body is also reduced.

In the case of a preferred refinement of the method according to the invention, the vacuum cleaner is equipped with just a single filter, which is impinged upon by external air for a short time to clean it.

The vacuum cleaner may have a number of external air inlets, which can in each case be closed by means of a closing valve. By simultaneous opening of all the closing valves, a large amount of external air can be fed to the at least one filter within a short time. However, this requires careful coordination of the opening movements of the valve bodies of the closing valves that are used. It is more advantageous if the entire surface area of the at least one filter that is oriented away from the dirt collecting container is impinged upon by external air by opening only a single closing valve.

The at least one closing valve is preferably actuated electronically. Thus, it is possible for example to use an electromagnet, with the aid of which a movable valve body can be held on the valve seat in a closed position by applying current to the electromagnet. In order to open the closing valve, the current supply to the electromagnet is interrupted. Here it is of advantage if the valve body is equipped with a magnetizable element, which in the closed position of the valve body lies against the end face of the electromagnet and forms a closed magnetic circuit with the electromagnet. The magnetizable element, for example a plate containing iron, concentrates the field lines of the electromagnet in the valve body, so that the latter is reliably held in its closed position under the action of the magnetic force. If, however, the valve body assumes a distance from the valve seat, the magnetic circuit is interrupted, since the magnetizable element also assumes a distance from the electromagnet. This has the consequence that the magnetic force exerted by the electromagnet has only a very short range. In the case of an opening movement, the valve body consequently only experiences a magnetic force in the direct vicinity of the valve seat, while even at a distance of approximately 2 mm between the electromagnet and the magnetizable element the magnetic force is so small that it cannot return the valve body into its closed position. Rather, when there is an interruption in the current supply to the electromagnet, the valve body performs its movement away from the valve seat in spite of the closing force of the closing spring until it is acted upon with a repulsion force in the direction of the valve seat by the resilient stop element.

It is advantageous if the at least one closing valve is actuated in a time-controlled manner. For example, it may be provided that the closing valve is actuated periodically, preferably at time intervals of less than one minute, in particular time intervals of 10 to 30 seconds, the closing valve being opened for less than one second, in particular for less than 0.5 of a second.

The actuation of the at least one closing valve may take place at different time intervals. For example, the closing valve may initially be kept closed for 10 to 30 seconds, to then be opened for a short time, for example, for approximately one tenth of a second, after a number of shorter time intervals.

As mentioned at the beginning, the invention also relates to a vacuum cleaner for carrying out the aforementioned method. The vacuum cleaner comprises a dirt collecting container, which has a suction inlet and is in flow connection with at least one suction unit via at least one filter and at least one suction extraction line. The vacuum cleaner also comprises at least one external air inlet which opens into the suction extraction line downstream of the at least one filter and is adapted to be closed by means of at least one closing valve, wherein the at least one closing valve has a valve body which is movable back and forth between a closed position and an open position, and is acted upon by a closing spring with a closing force, which valve body lies against a valve seat in the closed position and is at a distance from the valve seat in the open position.

In order to develop such a vacuum cleaner in such a way that all the filters can be flowed through by external air during suction operation, but there is no noticeable interruption in suction operation for filter cleaning, it is proposed according to the invention that associated with the valve body is a resilient stop element, which acts upon the valve body in the open position with a repulsion force in the direction of the valve seat, the stop element only acting with a force upon the valve body when the latter is disposed at a distance from the valve seat.

As already explained, the resilient stop element allows a short opening movement of the valve body to be reliably achieved, wherein initially, starting from its closed position, it is only acted upon by the closing force of the closing spring. Only when the valve body assumes a certain distance from the valve seat does the resilient stop element come into effect, acting upon the valve body with a repulsion force. The resilient stop element consequently absorbs the kinetic energy of the valve body and accelerates it back in the direction of the valve seat. The brief opening movement of the valve body makes it possible for the filter to be impinged upon by external air for a short time, so that it undergoes a pressure surge and can be cleaned. Furthermore, external air can flow through the filter in the direction of counterflow, whereby the cleaning effect is intensified. Impingement with external air takes place only over a very short time period, in particular over a time period of less than one second, preferably less than 0.5 of a second. The suction operation of the vacuum cleaner can proceed virtually continuously, and effective filter cleaning nevertheless achieved. External air only enters the dirt collecting container for a very short period of time, so that the suction flow in the region of the suction inlet of the dirt collecting container is not noticeably interrupted. The vacuum cleaner is consequently distinguished by a simple construction, it being possible for all the filters present to be flowed through by suction air at the same time in suction operation and for the entire side of the at least one filter that is oriented away from the dirt collecting container to be impinged upon by external air by the at least one closing valve being opened for a short time. The external air is abruptly fed to the filter, the at least one suction unit being flow-connected to the filter permanently, that is to say also during the time during which it is being cleaned.

The closing spring is preferably restrained between the valve body and a filter holder, the at least one filter being held on the filter holder. The closing spring is consequently configured as a compression spring which permanently acts upon the valve body with a closing force. The closing spring is biased both in the closed position and in the open position of the valve body, it being supported on the filter holder. The filter holder on the one hand consequently has the function of forming a holder for the at least one filter and the filter holder on the other hand represents an abutment for the closing spring. Here, the closing spring lies against the side of the filter holder that is oriented away from the filter. It is of advantage here if the filter holder has a collar which projects in the direction of the closing valve and circumferentially surrounds an end region of the closing spring. Alternatively, it may be provided that the filter holder has a receptacle which is entered by the closing spring.

It is of particular advantage if the resilient stop element is also disposed on the filter holder. For this purpose, the filter holder may have a collar which projects in the direction of the closing spring and circumferentially surrounds an end region of the resilient stop element. Alternatively, it may be provided that the filter holder has a recess which is entered by an end portion of the resilient stop element.

The resilient stop element may be configured in various forms. It is advantageous if it is formed as a stop spring.

The stop spring preferably has a greater spring constant than the closing spring. The stop spring is consequently harder than the closing spring, that is to say a higher force is required to compress the stop spring than is the case for the closing spring. In a way similar to the closing spring, the stop spring may have a linear characteristic or a non-linear characteristic. For example, it may be provided that the stop spring and/or the closing spring become harder with increasing spring deflection.

In the case of a preferred configuration of the vacuum cleaner according to the invention, the closing spring and the stop spring are configured as helical springs of different diameters, one of the two helical springs circumferentially surrounding the other helical spring. This makes it possible for the closing spring and the stop spring to be disposed in a space-saving manner and additionally makes simple assembly possible.

Preferably, the closing spring circumferentially surrounds the stop spring. This has the advantage that the valve body in the closed position is held in its closed position by a relatively large closing spring. This improves the stability of the valve body.

As already explained, the closing spring is preferably formed as a helical spring. It is advantageous here if the diameter of the closing spring is at least ⅓ of the diameter of the valve body, since the risk of a tilting movement of the valve body can be reduced as a result.

It is particularly advantageous if the diameter of the closing spring is at least half the diameter of the valve body.

In the case of a preferred embodiment, the ratio of the diameters of the two helical springs is approximately 1:3. It has been found that the functional capability of the closing valve can be improved by such dimensioning of the helical springs.

As already presented, the resilient stop element is preferably formed as a helical spring. Here it is advantageous if the valve body has a guiding pin, which enters the helical spring. This reduces the risk of the valve body canting during its opening movement.

The valve body may be pivotably mounted on the least one valve seat or on a part that is fixed to the device. It is particularly advantageous, however, if the valve body is displaceably held. In particular, it may be provided that the closing valve has guiding elements for guiding the valve body.

The guiding elements are preferably configured in a cylindrical form. This provides the possibility of turning the valve body about the cylinder axis of the guiding elements without this adversely affecting the opening and closing movement of the valve body. Consequently, the risk of the valve body canting is reduced by the provision of cylindrical guiding elements.

It may be provided that the guiding elements comprise a guiding sleeve and a guiding receptacle, the guiding sleeve entering the guiding receptacle. Both in the closed position and in the open position of the valve body, the guiding sleeve enters the guiding receptacle. As a result, a constant alignment of the valve body in relation to the valve seat is ensured. The guiding sleeve may be disposed on the valve body and the associated guiding receptacle may be disposed on a valve holder that forms the valve seat. However, a converse configuration is also conceivable, such that the guiding sleeve is positioned on the valve holder and the guiding receptacle is positioned on the valve body.

In the case of a particularly preferred configuration of the vacuum cleaner according to the invention, the closing valve has a magnetic holder, which acts upon the valve body in the closed position with a magnetic holding force. Consequently, in its closed position, the valve body undergoes on the one hand loading by the closing spring and on the other hand loading by the magnetic holder. It is consequently reliably ensured that, in the closed position, the valve body lies against the valve seat in a sealing manner and reliably interrupts the flow connection between the external air inlet and the suction extraction line.

A permanent magnet may be used, for example, as the magnetic holder. However, it is of advantage if the magnetic holder has a controllable electromagnet, since this makes simple time-dependent control of the closing valve possible, in that current is applied to the electromagnet in the closed state of the closing valve and the current supply to the electromagnet is interrupted to open the closing valve.

It is particularly advantageous if the electromagnet is disposed on a valve holder of the closing valve that forms the valve seat, and if the valve body has a magnetizable element which is associated with the electromagnet and forms a closed magnetic circuit with the electromagnet in the closed position of the valve body. In the closed position of the valve body, the magnetizable element concentrates the field lines of the electromagnet. If, however, the valve body assumes a distance from the valve seat, the magnetic circuit between the electromagnet and the magnetizable element is interrupted. The magnetizable element may be formed for example as a plate and be produced from a material containing iron. In the closed position of the valve body, it may lie against the end face of the electromagnet.

The combined use of the electromagnet, the closing spring and the resilient stop element has the advantage that, in the closed position, the valve body can be made to lie against the valve seat in a sealing manner with the aid of the electromagnet to which current has been applied. If the closing valve is to be opened, the current supply to the electromagnet is interrupted. With the closing valve closed, the valve body is impinged upon on its side that is oriented toward the external air inlet by the pressure of the external air, whereas negative pressure is present on its side that is oriented away from the external air inlet. If the current supply to the electromagnet is interrupted, the pressure difference present at the valve body has the effect that it lifts off from the valve seat counter to the action of the closing spring, so that the closing valve is opened. At a distance from the valve seat, the valve body butts against the resilient stop element, which acts upon the valve body with a repulsion force in the direction of the valve seat. Under the action of the repulsion force and the closing force exerted by the closing spring, the valve body reaches the valve seat again. The closing spring has the function here of returning the valve body into the range of the magnetic field of the electromagnet, so that the valve body can be held on the valve seat again by the electromagnet to which current is again applied.

The vacuum cleaner may have a number of filters; however, it proves to be particularly advantageous if the vacuum cleaner comprises a single filter. In particular, it may be provided that the filter is adapted to be impinged upon by external air over its entire surface area by all the closing valves being opened at the same time. In the case of a structurally particularly simple configuration of the vacuum cleaner according to the invention, it has merely a single closing valve, which is positioned on the side of a filter holder having flow passages that is oriented away from the single filter. The single filter is impinged upon by external air over its entire surface area by opening of the closing valve.

The configuration according to the invention of the vacuum cleaner makes it possible for the side of the at least one filter that is oriented away from the dirt collecting container to be impinged upon by external air for a short time and for this air to be extracted within a short time by means of the suction unit, which is in flow connection with the filter even when the closing valve is open. It is advantageous if, during the cleaning of the filter, the valve body performs a continuous movement from its closed position via its open position back into its closed position. In the case of such a configuration, when the closing valve is opened, the valve body is first accelerated strongly in the direction away from the valve seat and then strongly decelerated with the aid of the resilient stop element, and reversed in its direction of movement, to then be accelerated back in the direction of the valve seat.

The entire movement of the valve body from its closed position via the open position back into the closed position can take place within fractions of a second.

In the case of a preferred embodiment, the at least one filter is adapted to be acted upon with external air by means of the closing valve for less than 200 milliseconds, in particular for less than 100 milliseconds. Being acted upon in this way means that there is no noticeable interruption in suction operation for the user, but it results in effective cleaning of the filter.

The at least one filter can preferably be impinged upon by external air by means of the at least one closing valve while maintaining a negative pressure in the region of the opening of a suction hose opening into the suction inlet. If the at least one closing valve is opened, the pressure on the side of the filter that is oriented away from the dirt collecting container abruptly increases and is then reduced again. The sudden pressure increase brings about effective cleaning of the filter, since the pressure increase is however reduced again right away by the at least one suction unit and does not lead to a complete interruption in the negative pressure in the region of the opening of the suction hose opening into the suction inlet. Rather, virtually continuous suction operation can be maintained.

The following description of a preferred embodiment of the invention serves for further explanation in conjunction with the drawings.

DETAILED DESCRIPTION OF THE INVENTION

Figure 1:
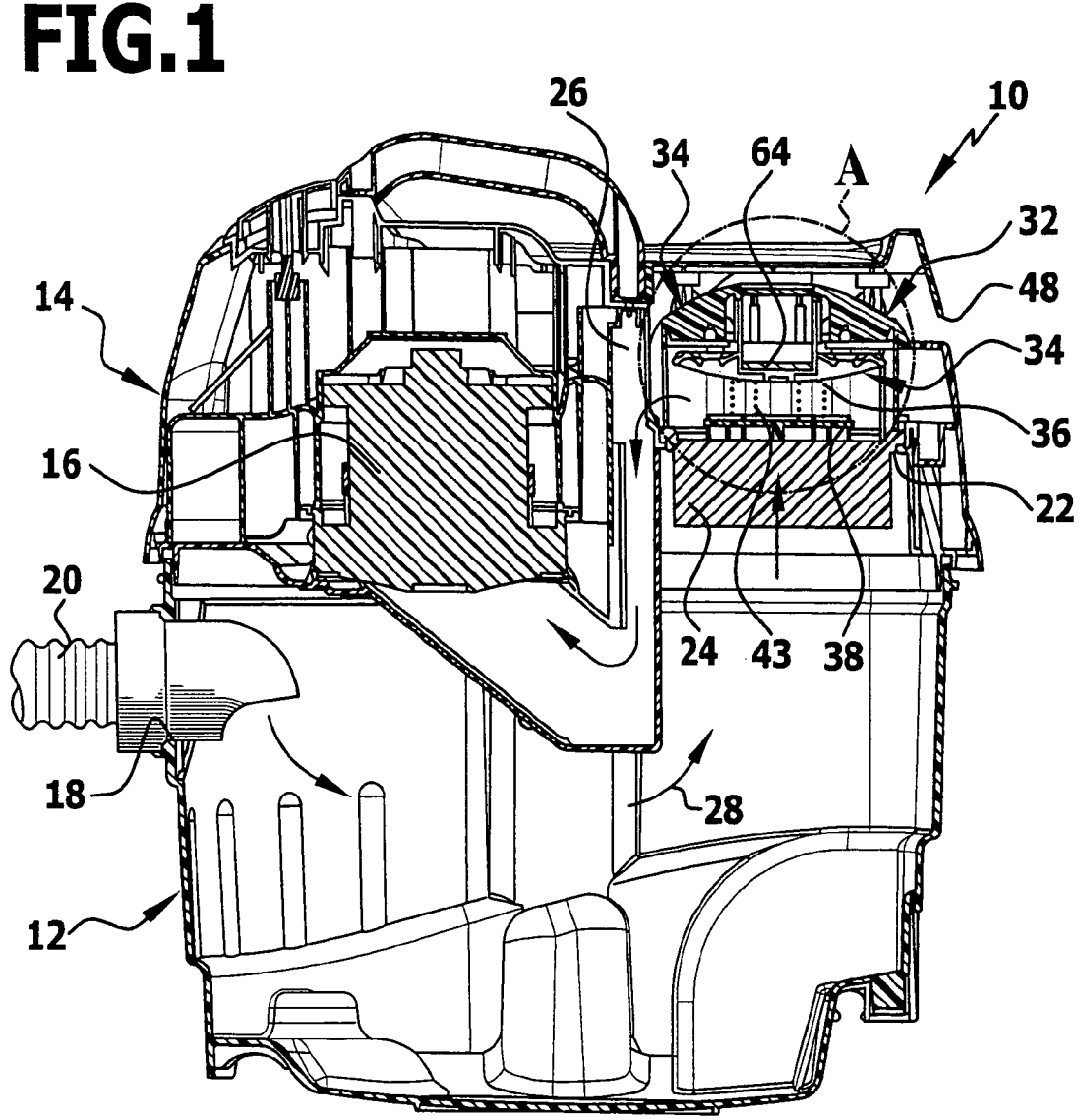
FIG. 1 shows a schematic sectional view of a vacuum cleaner according to the invention.

Schematically represented in the drawing is a vacuum cleaner 10, with a lower part, which forms a dirt collecting container 12, mounted on which is an upper part 14, which accommodates a suction unit 16. The dirt collecting container 12 comprises a suction inlet 18, to which a suction hose 20 can be connected. At the free end of the suction hose 20 (not represented in the drawing to achieve a better overview), a suction nozzle may be connected. Alternatively, it may be provided that the suction hose 20 is connected to a working tool, for example a drilling unit or a milling unit, so that dust produced during the operation of the working tool can be sucked away.

The upper part 14 forms a suction outlet 22 for the dirt collecting container 12. Held on the suction outlet 22 is a folded filter 24, which is followed by a suction extraction line in the form of a suction channel 26. By way of the suction channel 26, the folded filter 24 is flow-connected to the suction unit 16. The dirt collecting container 12 can be acted upon permanently by negative pressure from the suction unit 16 via the suction channel 26 and the folded filter 24, so that there forms a suction flow, symbolized in FIG. 1 by the arrows 28, under the action of which dirt can be sucked into the dirt collecting container 12. By means of the folded filter 24, the dirt particles can be separated from the suction flow 28.

Figure 2:
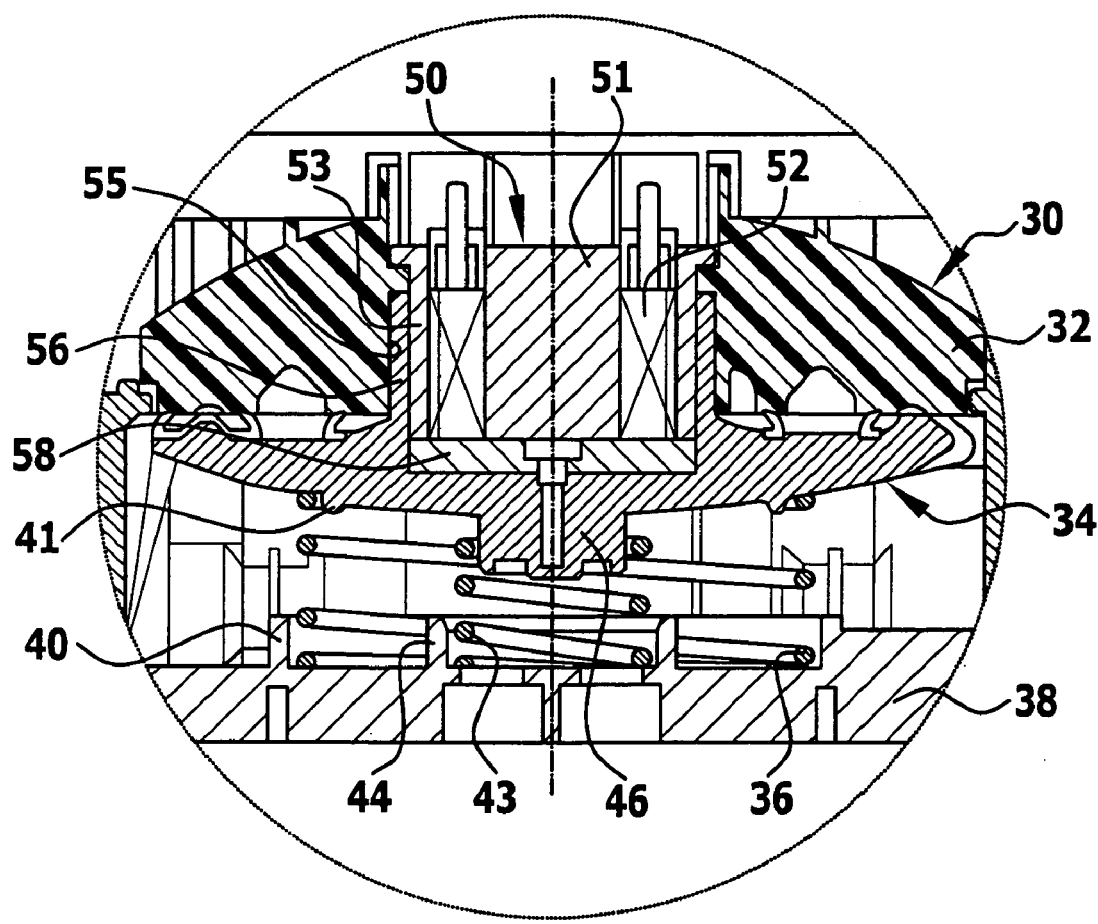
FIG. 2 shows an enlarged representation of detail A from FIG. 1.

Disposed above the folded filter 24 in the upper part 14 is a closing valve 30, which is shown enlarged in FIG. 2. It comprises a valve holder 32, which is fixedly disposed in the upper part 14, forms a valve seat and interacts with a valve body in the form of a circular valve disk 34. The valve disk 34 is acted upon by a closing force in the direction of the valve holder 32 by means of a closing spring 36. The closing spring 36 has a linear characteristic and is restrained between a plate-like filter holder 38, having a multiplicity of flow passages and fixedly disposed in the upper part 14, and the valve disk 34. The filter holder 38 has on its upper side that is oriented toward the closing valve 30 an outer annular collar 40, which circumferentially surrounds the neighboring end region of the closing spring 36 formed as a helical spring. The valve disk 34 has on its underside that is oriented toward the filter holder 38 an annular bead 41, against the outside of which the closing spring 36 lies.

In addition to the closing spring 36, the filter holder 38 carries a resilient stop element in the form of a stop spring 43, which in a way similar to the closing spring 36 has a linear characteristic and is formed as a helical spring. For holding the stop spring 43, the filter holder 38 has on its upper side that is oriented toward the closing valve 30 an inner annular collar 44, which is disposed concentrically in relation to the outer collar 40 and is entered by the stop spring 43. Formed on the underside of the valve disk 34, aligned with the inner annular collar 44, is a guiding pin 46, which in the closed position of the valve disk 34 that is represented in FIG. 2 is surrounded by an end region of the stop spring 43. By contrast with the closing spring 36, the stop spring 43 is not biased in the closed position of the valve disk 34. Only when the valve disk 34 lifts off from the valve seat of the valve holder 32 does the stop spring 43 come up against the underside of the valve disk 34 and become a little compressed when there is further movement of the valve disk 34. This is discussed in more detail below.

The valve holder 32 has a multiplicity of through-openings (not represented in the drawing), the opening regions of which are closed by the valve disk 34 in the closed state of the closing valve 30. Level with the valve holder 32, the upper part 14 has a lateral opening 48. External air can flow into the through-openings of the valve holder 32 via the lateral opening 48. If the valve disk 34 assumes a position at a distance from the valve holder 32, the lateral opening 48 is in flow connection with the suction channel 26 via the through-openings of the valve holder 32 and external air can impinge upon the side of the filter 24 that is oriented away from the dirt collecting container 12. When the valve disk 34 is in the closed position, the flow connection between the suction channel 26 and the lateral opening 48 is interrupted.

In a central region, the valve holder 32 carries an electromagnet 50 with a magnetic core 51, which is surrounded by a magnetic coil 52. The outer termination of the electromagnet 50 is formed by a cylindrical shell 53, which in the same way as the magnetic core 51 is produced from a magnetizable material. The shell 53 is circumferentially surrounded by a guiding receptacle in the form of an annular space 55, which is entered by a guiding sleeve 56 formed on the upper side of the valve disk 34. The guiding sleeve 56 receives a magnetizable element in the form of an iron plate 58, which in the closed position of the valve disk 34 lies against the free end face of the electromagnet 50 and in combination with the magnetic core 51 and the sleeve 53 forms a closed magnetic circuit. This closed magnetic circuit concentrates the magnetic field lines of the electromagnet 50.

If the closing valve 30 has been closed, a negative pressure forms in the dirt collecting container 12 and in the suction channel 26. Dirt particles and similarly liquid droplets can consequently be sucked into the dirt collecting container 12. The electromagnet 50 is in connection via current supply lines, which are not represented in the drawing to achieve a better overview, with an electrical control unit (likewise not represented in the drawing) of the vacuum cleaner 10. From the electrical control unit, current is applied to the electromagnet 50 during normal suction operation of the vacuum cleaner 10, and the valve disk 34 is reliably held in its closed position on account of the magnetic field forming. The holding force of the electromagnet 50 is augmented by the spring force of the closing spring 36.

During normal suction operation, dirt particles are deposited on the filter 24, so that it gradually becomes clogged. At time intervals of 10 to 30 seconds, for example, in particular time intervals of approximately 15 seconds, the current supply to the electromagnet 50 is therefore interrupted for a short time. This has the consequence that the magnetic field of the electromagnet breaks down within a very short time, and consequently the magnetic holding force for the valve disk 34 is no longer present. This in turn has the effect that the valve disk 34 lifts off from the valve seat counter to the action of the closing spring 36, on account of the pressure difference acting on it, which is produced by the outside pressure of the external air present in the region of the valve holder 32 and the inside pressure within the suction channel 26. External air can then suddenly flow into the suction channel 26 through the through-openings of the valve holder 32. The filter 24 is consequently impinged upon by external air in an impact-like manner on its side that is oriented away from the dirt collecting container 12. This leads to the filter 24 undergoing a mechanical shaking effect. Furthermore, the filter 24 is flowed through by the external air in the direction of counterflow. This has the overall consequence of effective cleaning of the filter 24.

After a short lifting movement, the valve disk 34 lifting off from the valve seat comes with its underside up against the stop spring 43, which acts upon the valve disk 34 with a repulsion force in the direction of the valve holder 32. The stop spring 43 absorbs the kinetic energy of the valve disk 34. The latter is accelerated by the stop spring 43 in the direction of the valve seat. When the valve disk 34 approaches the valve seat, the stop spring 43 releases the valve disk 34. The latter is returned to the valve seat by the closing spring 36, so that the iron plate 58 comes to lie against the free end face of the electromagnet 50 again. At the latest at this point in time, current is once again applied to the electromagnet 50 by the associated control unit, so that the valve disk 34 is again held in a sealing manner against the valve seat by the electromagnet 50. The interruption of the current supply for the electromagnet 50 takes place only over a time period of at most 100 milliseconds, so that the closing valve 30 opens only for a very short time and external air can get to the filter 24 only for a very short time. Subsequently, current is again applied to the electromagnet 50, to be precise for a time period of approximately 10 to about 30 seconds, in particular for a time period of approximately 15 seconds. Consequently, brief filter cleaning takes place every 15 seconds. On account of the short opening of the closing valve 30, a negative pressure is maintained in the region of the opening of the suction hose 20 flowing into the suction inlet 10 even during the filter cleaning. This has the consequence that virtually continuous suction operation is possible for the user and reliable filter cleaning is nevertheless ensured.

The invention claimed is:

1. Method for cleaning the filters of a vacuum cleaner, the vacuum cleaner comprising a dirt collecting container, which dirt collecting container has a suction inlet and is in flow connection with at least one suction unit via at least one filter and at least one suction extraction line, and at least one external air inlet which opens into the suction extraction line downstream of the at least one filter and which can be closed by means of at least one closing valve, wherein the at least one closing valve has a valve body which is movable back and forth between a closed position and an open position and is acted upon by a closing spring with a closing force in a direction towards the valve seat, which valve body lies against a valve seat in the closed position and is at a distance from the valve seat in the open position, said method comprising:

opening the at least one closing valve such that a side of the at least one filter that is oriented away from the dirt collecting container is impinged upon by external air, wherein:

the valve body is acted upon, irrespective of its position, by the closing force of the closing spring, and in a position at a distance from the valve seat, the valve body is additionally acted upon in the direction towards the valve seat by a repulsion force of a resilient stop element, which only acts with a force upon the valve body when the valve body is disposed at a distance from the valve seat.

2. Method according to claim 1, wherein the vacuum cleaner is equipped with a single filter.

3. Method according to claim 1, wherein an entire surface area of the at least one filter that is oriented away from the dirt collecting container is impinged upon by external air by opening a single closing valve.

4. Method according to claim 1, wherein the at least one closing valve is actuated electronically.

5. Method according to claim 1, wherein the at least one closing valve is actuated in a time-controlled manner.

6. Method according to claim 5, wherein the at least one closing valve is actuated periodically at time intervals of less than 30 seconds.

7. Vacuum cleaner comprising:
at least one suction unit,
at least one filter,
at least one suction extraction line,
a dirt collecting container, which has a suction inlet and is in flow connection with the at least one suction unit via the at least one filter and the at least one suction extraction line, and
at least one external air inlet which opens into the suction extraction line downstream of the at least one filter,
at least one closing valve adapted to close the at least one external air inlet, the at least one closing valve having a valve body which is movable back and forth between a closed position and an open position and which is acted upon by a closing spring with a closing force in a direction towards the valve seat, which valve body lies against a valve seat in the closed position and is at a distance from the valve seat in the open position, and
a resilient stop element associated with the valve body, which resilient stop element additionally acts upon the valve body in the open position with a repulsion force in the direction towards the valve seat, the stop element only acting with a force upon the valve body when the valve body is disposed at a distance from the valve seat,
wherein opening the at least one closing valve results in a side of the at least one filter that is oriented away from the dirt collecting container being impinged upon by external air resulting in a cleaning of the at least one filter.

8. Vacuum cleaner according to claim 7, wherein the closing spring is restrained between the valve body and a filter holder, the at least one filter being held on the filter holder.

9. Vacuum cleaner according to claim 8, wherein the resilient stop element is disposed on the filter holder.

10. Vacuum cleaner according to claim 7, wherein the resilient stop element is configured as a stop spring.

11. Vacuum cleaner according to claim 10, wherein the stop spring has a greater spring constant than the closing spring.

12. Vacuum cleaner according to claim 10, wherein the closing spring and the stop spring are configured as helical springs of different diameters, one of the two helical springs circumferentially surrounding the other helical spring.

13. Vacuum cleaner according to claim 12, wherein the closing spring circumferentially surrounds the stop spring.

14. Vacuum cleaner according to claim 7, wherein the closing spring is configured as a helical spring, a diameter of which is at least ⅓ of a diameter of the valve body.

15. Vacuum cleaner according to claim 14, wherein the diameter of the closing spring is at least half the diameter of the valve body.

16. Vacuum cleaner according to claim 12, wherein a ratio of the diameters of the two helical springs is approximately 1:3.

17. Vacuum cleaner according to claim 7, wherein the resilient stop element is configured as a helical spring and the valve body has a guiding pin, which enters the helical spring.

18. Vacuum cleaner according to claim 7, wherein the closing valve has guiding elements for guiding the valve body.

19. Vacuum cleaner according to claim 18, wherein the guiding elements are configured in a cylindrical form.

20. Vacuum cleaner according to claim 18, wherein the guiding elements comprise a guiding sleeve and a guiding receptacle, the guiding sleeve entering the guiding receptacle.

21. Vacuum cleaner according to claim 7, wherein the closing valve has a magnetic holder, which acts upon the valve body in the closed position with a magnetic holding force.

22. Vacuum cleaner according to claim 21, wherein the magnetic holder has a controllable electromagnet.

23. Vacuum cleaner according to claim 22, wherein the electromagnet is disposed on a valve holder that forms the valve seat, and the valve body has a magnetizable element which is associated with the electromagnet and forms a closed magnetic circuit with the electromagnet in the closed position of the valve body.

24. Vacuum cleaner according to claim 7, wherein the vacuum cleaner has a single filter.

25. Vacuum cleaner according to claim 24, wherein the filter is adapted to be impinged upon by external air over its entire surface area by opening of the at least one closing valve.

26. Vacuum cleaner according to claim 7, wherein the valve body is movable continuously from the closed position via the open position back into the closed position.

27. Vacuum cleaner according to claim 7, wherein the at least one filter is adapted to be impinged upon by external air by means of the at least one closing valve for less than 200 milliseconds.

28. Vacuum cleaner according to claim 7, wherein the at least one filter is adapted to be impinged upon by external air by means of the at least one closing valve while maintaining a negative pressure in a region of an opening of a suction hose opening into the suction inlet.

* * * * *